United States Patent [19]

Costa

[11] 4,236,816
[45] Dec. 2, 1980

[54] ELECTRONIC AUTOMATIC TIMING DEVICE FOR PHOTOGRAPHIC ENLARGEMENTS OR REPRODUCTIONS BY PROJECTION OR CONTACT

[76] Inventor: Eugenio Costa, C.so Re Umberto, 17, Torino 10121, Italy

[21] Appl. No.: 839,250

[22] Filed: Oct. 4, 1977

[30] Foreign Application Priority Data

Oct. 4, 1976 [IT] Italy ................. 69378 A/76

[51] Int. Cl.³ .......................... G03B 27/78
[52] U.S. Cl. .......................... 355/68; 355/83
[58] Field of Search ............... 355/68, 83, 38; 250/214 P; 354/60 L, 60 E, 53; 330/2; 340/657–664

[56] References Cited

U.S. PATENT DOCUMENTS

| | | | |
|---|---|---|---|
| 2,952,780 | 9/1960 | Rogers, Jr. | 355/68 |
| 3,790,789 | 2/1974 | Takahashi et al. | 355/68 |
| 3,967,288 | 6/1976 | Yamamoto | 354/60 L |
| 4,027,314 | 5/1977 | Iguchi et al. | 354/60 L |
| 4,041,504 | 8/1977 | Iodvalkis et al. | 354/60 L |

Primary Examiner—L.T. Hix
Assistant Examiner—W. J. Brady
Attorney, Agent, or Firm—Alan H. Levine

[57] ABSTRACT

A device giving automatically correct exposure times for printing photographs, based on the principle of reflected-light measurement and integration, with a light measuring probe which may project a cone of light on the printing plane to precisely show the location and the size of the measuring area which can thus be controlled and varied at will. The electronic circuit comprises a luminous over-range indicator lighting up when the device is operated in conditions of too low or too high illumination for the circuit to work within its limits of linear operation. A potentiometer can be set for the sensitivity of the photographic material used and a single switch allows both interruption of already initiated exposure cycles at any moment, and switching off the darkroom safelight at the same time powering the enlarger when it is wished to control light conditions and/or measuring zone location before printing, in order to avoid any chance of incorrect exposure times.

6 Claims, 3 Drawing Figures

ELECTRONIC AUTOMATIC TIMING DEVICE FOR PHOTOGRAPHIC ENLARGEMENTS OR REPRODUCTIONS BY PROJECTION OR CONTACT

The use of electronic timing devices for printing photographs is well known. With such devices the sensitized paper is exposed to light for a time period which is automatically proportional to the brightness of the projected image.

Such devices generally have the following features: it is possible to evaluate the brightness of the image being projected onto the printing plane with no sensitized material on it; in this instance the measurement is carried out on a spot having an average brightness with respect to the whole photograph, or two measurements are carried out, one for the brightest and one for the darkest spot in order to obtain the average brightness value. Once a sensitivity constant has been set on the device according to the sensitized material being used, the average brightness value is referred to and the necessary lighting time for a correct exposure is obtained.

Actually this kind of device is semi-automatic for it requires the operator to carry out the measuring, which is generally made by zero setting a galvanometer pointer by suitably rotating a potentiometer knob; furthermore, the brightness of the projected image must essentially be identical to that which was detected during the measurement, as the exposure time will be exact only under these conditions. Any mains supply voltage variation with consequent variation of the brilliancy of the projection lamp causes an appreciable exposure error.

Another known type of such devices is provided with a heightened transparent printing plane which allows for the measurement of the projected image brightness THROUGH the sensitized paper sheet by suitably placing a photometric probe in the space beneath the printing plane.

In this instance there is an automatic measure but not only the sensitivity of the material used must be taken into account, but also the support thickness which causes a variation in the intensity of the light passing through it, and even the size of the sensitized sheet. Indeed only the light passing through the sheet and not reaching beyond its edges must be measured; therefore the perimetric edges of the sheet are covered with opaque strips which also serve to obtain a white margin surrounding the photographic image. From this comes the name "electronic framer."

From the summary description above it is quickly realized that such known electronic timing devices are not likely to be used by amateurs as making mistakes is quite easy.

There is yet another kind of timing device which obtains the measure of the image brightness by reflection.

With such method it is necessary to keep a photometric probe above the sensitized sheet during the exposure, of course without intercepting the projected light beam, and with the sensitive face of the probe directed TOWARDS THE SHEET, and not towards the projection lens; the light thus measured is the one being REFLECTED by the sensitive sheet and is proportional to the projected light.

In this way the need for taking into account the transparence of the sheet, which may be of the same sensitivity but of a different thickness, is avoided and it is no longer necessary to prevent the light from spreading outside the sheet borders as the probe may be located so as not to take into account any outer area.

It clearly appears that this solution features the greatest advantages as for simplicity of use and reliability of results. However this kind of device does have some drawbacks which may be summarized as follows:

It is not easy to know whether the probe is not "watching" also an area outside the light field: such possibility causes a gross exposure error as the bright and the dark parts are averaged thus giving an overexposure. Even in less extreme cases it is not easy to keep in mind the possibly less interesting image areas and exclude them at will from the measure in order to get an exposure time exactly related only to the most interesting parts.

There is also the risk of knowing too late that the projected image is too luminous for the measuring range of the device or, on the contrary, as often happens with heavy enlargements, that the image is insufficiently bright. In both instances the correction is made subsequently by, respectively, closing or opening the diaphragm and proceeding by trial and error with a considerable waste of sensitive paper.

In order to overcome the above mentioned drawbacks the subject matter of the present invention is an electronic automatic timing device for photographic enlargements and reproductions by projection or by contact, characterized in that it provides visual control of measurement field and luminous signalling of a possible exposure error due to both a lack and an excess of light.

More particularly the timing device according to this invention is characterized in that it comprises an electronic probe capable of emitting a light beam, preferably non actinic, with a constant field angle, directed onto the printing plane and which superimposes itself on the projected image during its focussing and framing phase, thus providing a visual indication of the area to be considered during the exposure in order to avoid an erroneous orientation of the photoelectric probe and its direction towards any areas outside the image, allowing at the same time selection of a specific area of the image for its correct exposure. In the case of contact printing, the light beam from the probe is directed on to the negative superposed on the photosensitive paper.

A further distinctive feature of the device according to the invention comes from the fact that it comprises, in addition to a measuring and integrating electronic circuit a pair of comparators, operating in such a way as to detect a possible excess or lack of light for a correct subsequent exposure. In both instances, the falling of the voltage beyond the respective thresholds, causes the lighting up of one or two separate light-emitting diodes acting as warning light(s).

Wider and clearer particular features of the device according to the invention will be seen from the following detailed description referring to the drawing which has been enclosed only as a demonstrative example, and wherein.

Figure 1:
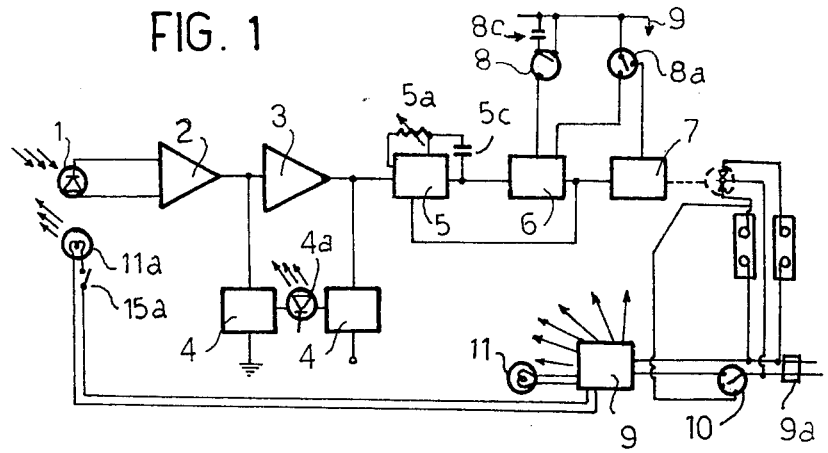
FIG. 1 is a block diagram of the device circuit.

Referring to FIG. 1 of the drawing, the circuit is divided into eleven conventional blocks: No. 1 indicates a silicon photodiode particularly suitable for photometric use, with very short response times (less than 5 millionths of a second) and a very wide response spectrum; No. 2 indicates a high gain preamplifier/current-to-voltage converter block; 3 is a buffer/voltage amplifier; 4 indicates a pair of voltage comparators with their outputs connected in parallel and to the light-emitting diode 4a acting as an overrange signal; 5 is a "Miller" integrator with a variable resistor, connected to 6, a bistable circuit with threshold or a comparator with hysteresis, electrically connected in turn to an assembly 7 comprising a power commutator (transistor plus relay, Triac or solid-state relay); 8 and 8a indicate two monostable tripping commutator (microswitches); 9 indicates a power supply which through 9a is connected to the mains supply network; 10 indicates a three position switch; and 11,11a indicates a pair of low voltage lamps.

More in detail the silicon photodiode 1 is connected to the inputs of preamplifier 2 which converts into voltage the current the photodiode generates linearly with the light it receives, and amplifies it some thousand times.

The voltage thus obtained is sent to the amplifier, 3, which brings the apparatus' sensitivity into the most convenient range and additionally separates the delicate preamplifier 2 from the two voltage comparators 4 and the integrator 5 whose input currents would alter their working conditions at low illumination levels.

The two comparators 4 detect and indicate by lighting the light-emitting diode 4a, connected to their outputs, respectively whether the light the photodiode 1 is intercepting is too low or excessive for the device, and this in a different way for each comparator. Precisely, the "minimum" comparator is connected to a reference voltage, preset as a function of the following integrator's characteristics, and lights the light-emitting diode whenever the voltage at the output of the voltage amplifier 3 is lower than the reference one; the "maximum" comparator is instead connected to ground (zero voltage) and lights the diode whenever the inverting input of the amplifier 3, connected so as to be in turn at zero voltage in the measurement range, shifts from this value as the amplifier has reached saturation (the condition which makes it impossible to give an output voltage proportional to the input voltage as the supply voltage has been reached).

Such a differentiated circuit solution provides an always constant and independent from possible supply voltage variations "minimum" level, and a "maximum" level suitable to follow the said possible fluctuations so as to always allow for the widest measurement range which may be given by the instrument.

The amplifier 3 output voltage in addition to being sent to the "minimum" comparator is also sent to the "Miller" integrator 5. This "block" comprises a variable resistor, a voltage amplifier and a high-capacity, low-loss capacitor 5c connected across the output and the inverting input of the amplifier. As described below the capacitor, during the time we shall call "waiting" time, is kept charged at a stabilized voltage in order to start each cycle in the same conditions of leakage current and to compensate the capacity variations caused by temperature changes; at the start of an exposure cycle the capacitor is no longer kept charged and the amplifier gradually discharges it following a linear voltage ramp whose slope is proportional to the voltage at the output of the voltage amplifier 3 and inversely proportional to the resistance exhibited by the variable resistor 5a.

The Miller integrator's output voltage is sent to a threshold bistable circuit 6; this "block" may remain in two different electrical conditions which are conventionally defined, respectively, "waiting" and "operating" conditions.

The bistable 6's output is connected to the integrator 5 so that, as already mentioned, the capacitor 5c is kept charged as long as the bistable 6 itself is in the "waiting" condition, in which it may be kept indefinitely. In order to bring the bistable 6 "operating" condition it is necessary to activate the starting switch 8 which sends, by means of a small capacitor 8c, a pulse of suitable features to the bistable 6; the latter, leaving the "waiting" condition, will enable the capacitor to be discharged and will remain in the "operating" condition until the bistable 6's input detects that the descending ramp at the output of the integrator 5 is crossing the zero. At this point the bistable goes back to the "waiting" condition taking the cycle to its end.

The output of the bistable 6, which behaves as a comparator with strong hysteresis, is sent in addition to the integrator 5, to the power commutator group 7 which has the function of switching off the safety lamp and simultaneously switching on the enlarger during all the time the bistable 6 stays in its "working" condition, thus providing the actual exposure cycle.

The power commutator group 7 and the bistable 6 are connected to a second tripping commutator 8a (microswitch) which carries out two different functions: (A) it permits checking, without beginning an exposure, whether the luminous intensity of the image to be printed is sufficient and not excessive for the apparatus, by forcing the power commutator 7 to execute the print commutation as long as the switch 8a is kept depressed; commutator 8a accomplishes this by cutting power to the bistable 6 and applying power instead to a biasing point in power commutator 7 causing the latter to energize the enlarger simultaneously shutting off the safelight; (B) should an exposure cycle have already been started, if it is wished to interrupt it the commutator 8a cuts the supply to the bistable 6 when depressed, taking back the whole circuit to the "waiting" condition when released. Upon release of commutator 8a, the latter no longer supplies power to the power commutator and instead restores power to bistable 6 which, having been temporarily unpowered, will now be locked with the integrator into its initial standby condition no matter which condition it was in before being cut off.

The operations described above obviously occur with the device being switched on; to this purpose a three position commutator 10 is provided, whose three positions correspond to: I. apparatus switched off; II. apparatus switched on; III. focussing, that is lighting the enlarger with the safety lamp also lit and with the timing apparatus off.

In the "ON" position a suitable power supply 9 is connected to the main network; this power supply is adapted to provide voltages suited to the circuit and a couple of lamps 11, 11a are connected to it. The lamp 11 informs the operator that the device is working and in addition allows the setting of the variable resistor to be read in the dark; the other lamp 11a is connected to the power supply 9 via a contact 15a located inside the head of the photometric probe (and via its connection cable 13) in order to accomplish the projection of a light beam exactly onto the area which will transmit reflected light to the photodiode 1.

Figure 2:
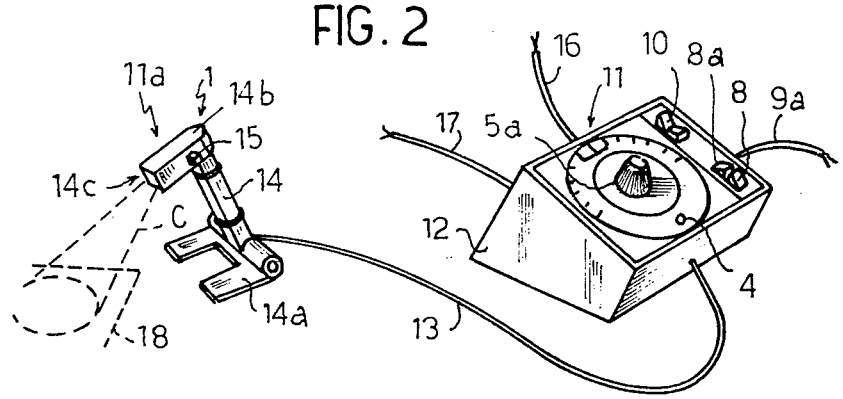
FIG. 2 is a perspective view of the complete device showing its use.

A preferred but not limiting implementation of the device described herewith is represented in FIG. 2, referring to which inside a suitable case 12 all components of the device are mounted and contained, excepting the lamp 11a and the silicon photodiode 1 which are located side by side and are carried by a sliding support 15 transversally and slidingly mounted in the head 14b of the telescopic arm 14, which is orientable with respect to the base 14a, and are electrically connected to the device enclosed in case 12 via a cable 13. Both the photodiode 1 and the lamp 11a, giving preferably inactinic light, are so mounted as to be alternatively shiftable into an identical position upstream of a window 15 located internally with respect to the front opening 14c of the head 14b. *The said head 14b,* suitably oriented, allows the lamp 11a to illuminate a selected zone of the working plane area, which corresponds exactly to the zone which will be watched by the photodiode 1 when it takes the position previously occupied by the lamp 11a.

The alternating movement of the support 15 causes the closing of an electric switch 15a (FIG. 1) only when the lamp 11a stays in correspondence to the window existing internally to the opening 14c.

Figure 3:
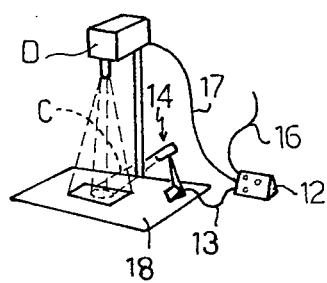
FIG. 3 illustrates in a reduced scale and in a perspective view the application of the device to an enlarger.

No. 17 indicates the feeding cable connecting the device to the enlarging apparatus D, FIG. 3; 16 is a small electric cable supplying the safety lamp and 9a indicates the connection of the device to the electric mains network. The other reference numbers correspond to those listed in the description of the diagram represented on FIG. 1. Referring to FIG. 2 and FIG. 3 the operation of the device, electrically connected to a known enlarger as well as to the mains network, is the following:

Having focused an image on the printing plane 18, the probe 14 is placed in the desired position for measurement; the timing device is then given power, the lamp 11a is then activated, thus projecting the control light beam C on the working plane. Now the photodiode 1 is brought in the position previously occupied by the lamp 11a.

If by depressing the key 8a the light-emitting diode lights up, the opening of the enlarger D's diaphragm must be adjusted until the diode becomes extinguished.

The apparatus is taken in the exposure position having previously regulated the knob of potentiometer 5 on a suitable position; in this phase the enlarger is off, the sensitized sheet is placed onto the printing plane 18 and by depressing the pushbutton 8 the exposure is started and it will go on for the time needed by the sensitized material being used, independently of the image brightness; the diaphragm opening may even be altered during the exposure as long as the warning diode 4a does not light up, with no exposure errors since the device accounts for the integral of the instantaneous brightness values.

When the enlarger is automatically shut off by the device, the exposure cycle is correctly achieved with the certainty that, once correctly developed, the photograph will be perfect.

Obviously the device described here is not limited by the foregoing description but it may be further improved and varied, particularly by changes

I claim:

1. A device for controlling the exposure of photographic prints to be used in connection with a separate enlarger or contact printer and a darkroom safelight, comprising
   a photometric element for receiving reflected light from a chosen area of the illuminated surface of the image to be printed,
   a light source for projecting light over said area,
   level sensing means,
   means responsive to the output of said photometric element, while the latter receives reflected light from said illuminated surface, for providing buffering and amplification to said photometric element's output signal and for commanding through said level sensing means an alert display to light up as soon as said photometric element's output signal is too high or too low for said responsive means to work linearly with said photometric element, and
   means for activating the enlarger or contact printer and safelight for a time dependent on the amount of the reflected light received by said photometric element during exposure.

2. A device as defined in claim 1 including a mechanical support for said photometric element and light source, said support comprising
   a telescopic stem,
   a box-shaped head hinged to said stem and having a front window,
   a sliding mount carrying said photometric element and light source mounted side-by-side and being movable within said box-shaped head so that either the photometric element or, alternately, the light source may be shifted into one identical position with respect to said box-shaped head's front window.

3. A device as defined in claim 2, wherein said mechanical support may be wholly moved and its said head may be raised, lowered and angled at will with respect to the surface of the image to be printed, so as to vary the dimensions and proportions of the area from which reflected light is received by said photometric element, that being the very same area over which, by suitably shifting said sliding mount, the light emitted by said light source falls.

4. A device as defined in claim 1 wherein said responsive means comprise a preamplifier, and amplifier, a pair of voltage comparators, one comparing the voltage at the inverting input of said amplifier with ground voltage, the other comparing said amplifier's output voltage with an internally generated reference voltage, and further comprising a display element connected to the outputs of both said comparators.

5. A device as defined in claim 4 and further including:
   an integrator receiving from said amplifier a voltage proportional to the intensity of reflected light collected by said photometric element,
   means for presetting any suitable proportionality coefficient in the relationship between light intensity detected by said photometric element and integration time obtained from said integrator, said means including a potentiometer;
   a bistable circuit with a threshold, connected to said integrator's output and back to one of its inputs by means of a positive feedback connection, so that, depending on which state said bistable is in, said integrator may either be locked in an initial standby condition or, respectively, may freely generate an integrating voltage ramp until this reaches said bistable's threshold voltage causing it to switch back to its other state; and a power commutator, controlled by said bistable circuit, giving power to said separate enlarger or contact printer during integration and, respectively, to said darkroom safelight during said standby condition, so that said photometric element may receive only the reflected actinic light used for exposure as long as this is carried out.

6. A device as defined in claim 5 including a single switch inserted in the circuit of said bistable and said power commutator so that:

when activated, it will cut power to said bistable circuit and apply the power instead to a biasing point in said power commutator causing the latter to energize said external enlarger or contact printer, simultaneously shutting off the safelight thus allowing preliminary checking whether reflected light received by said photometric element grants linear operation of said responsive means, said alert display lighting up if this is not so; and when released, it will no longer supply said power commutator and will restore power to said bistable circuit which, having been temporarily unpowered, will now be locked with said integrator into its initial standby condition no matter which condition it was in before being cut off, thereby ending any already started exposure cycle before automatic termination.

* * * * *